United States Patent [19]

Sasaki et al.

[11] Patent Number: 5,010,404
[45] Date of Patent: Apr. 23, 1991

[54] CHARACTERISTICS CORRECTOR

[75] Inventors: Yoshiyuki Sasaki; Kenji Tsunashima; Ikuo Ookuma; Toshifumi Fujii, all of Nagaokakyo, Japan

[73] Assignee: Mitsubishi Denki Kabushiki Kaisha, Tokyo, Japan

[21] Appl. No.: 283,961

[22] Filed: Dec. 13, 1988

[30] Foreign Application Priority Data

Dec. 14, 1987 [JP] Japan ................... 62-315597
Jun. 30, 1988 [JP] Japan ................... 63-164540
Jul. 22, 1988 [JP] Japan ................... 63-184247

[51] Int. Cl.$^5$ ............................... H04N 17/00
[52] U.S. Cl. ..................... 358/139; 358/21 V
[58] Field of Search ............. 358/139, 10, 133, 186, 358/188, 160, 327, 25, 35, 21 V; 360/27

[56] References Cited

U.S. PATENT DOCUMENTS 4,682,246 7/1987 Efron et al. .................. 358/139
4,757,392 7/1988 Awamoto et al. ............ 360/27
4,802,024 1/1989 Knowlton ..................... 360/27

FOREIGN PATENT DOCUMENTS 0241227 10/1987 European Pat. Off. .
55-645 1/1980 Japan ........................... 358/327

OTHER PUBLICATIONS

IEEE Article Entitled "Wide Band Video Signal Recorder having Level and Linearity Corrector", Bannai et al., 6/86.
Seishi Sasaki et al., "Wide Band Signal Recorder having Level and Linearity Corrector" IEEE Transactions on Consumer Electronics, vol. CE∝32, No. 3, 8/86.
"VTR for Bandwidth-Compressed Hivision", National Technical Report vol. 32, No. 4, Aug. 1986, Seishi Sasaki et al.

Primary Examiner—Edward L. Coles, Jr.
Assistant Examiner—Thomas D. Lee

[57] ABSTRACT

A characteristics corrector in a video signal processing system is described for correcting characteristics of the video signal processing system at the time of recording and/or reproducing a video signal. The corrector includes a reference pulse generating circuit for generating reference pulses of varying amplitude corresponding to gradations from a black level to a white level of a video signal to be recorded during a blanking period of the video signal to be recorded. It further includes a pulse amplitude data generating circuit for generating quantified data used for the discrimination of the amplitudes of the reference pulses. Also, a reference data interleaving circuit is included for interleaving, as a reference data, the reference pulses and pulse amplitude data indicative of the amplitudes thereof during the blanking period. Finally, a level correcting circuit is included for correcting the level of a reproduced video signal by the utilization of a plurality of reference pulses and pulse amplitude data obtained from the reproduced video signal.

10 Claims, 13 Drawing Sheets

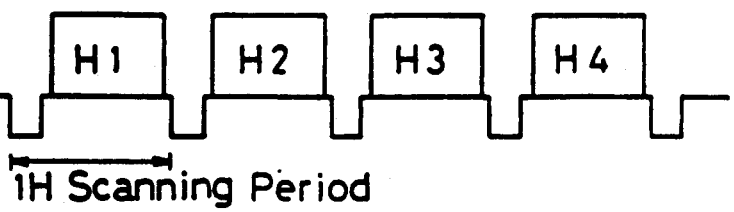
Fig. 1 (a) Input Signal
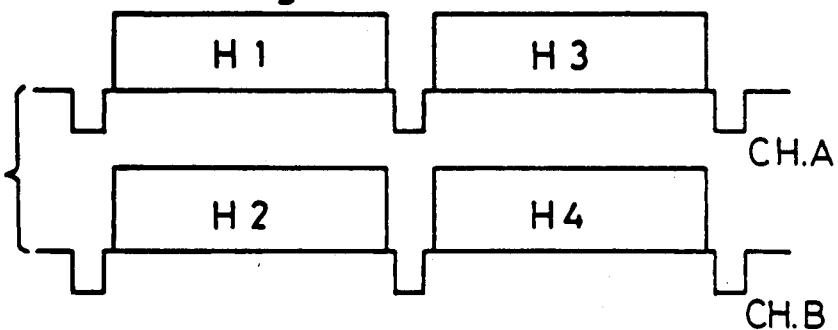
Fig. 1 (b) Recording Signal
Prior Art
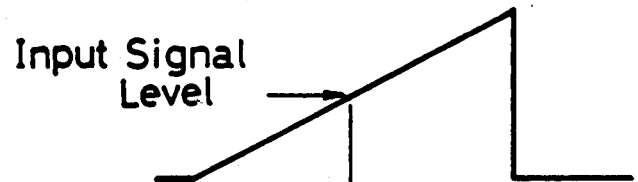
Fig. 3 (a) Input Ramp
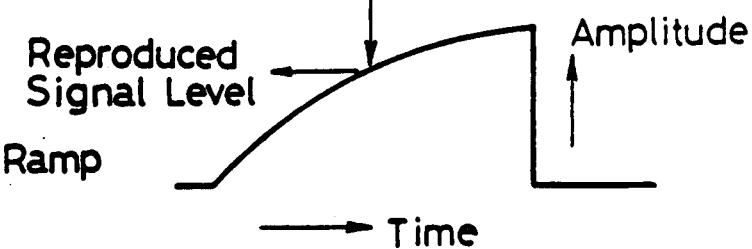
Fig. 3 (b) Reproduced Ramp

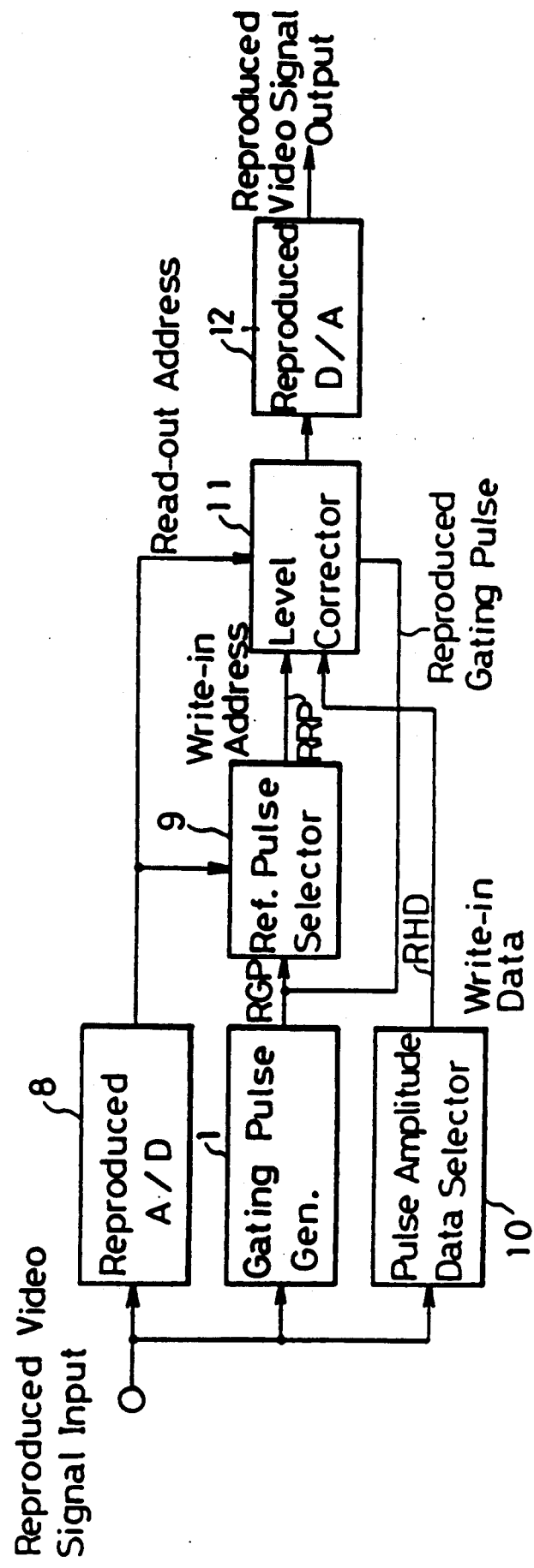

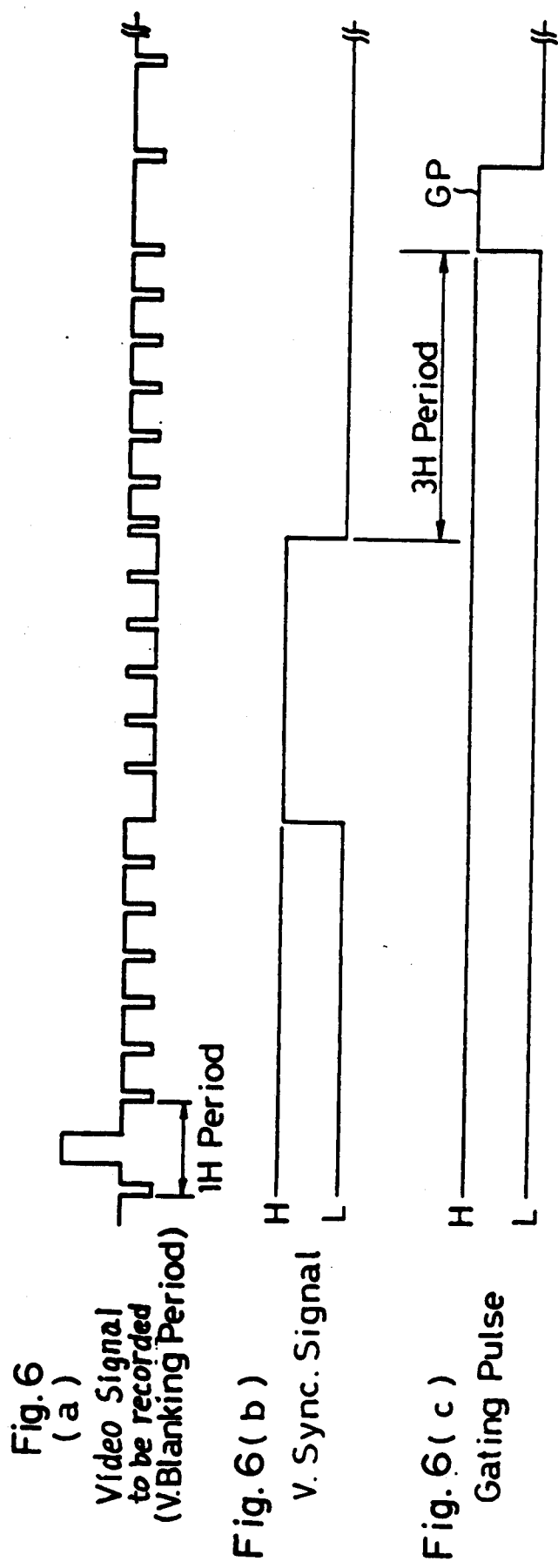

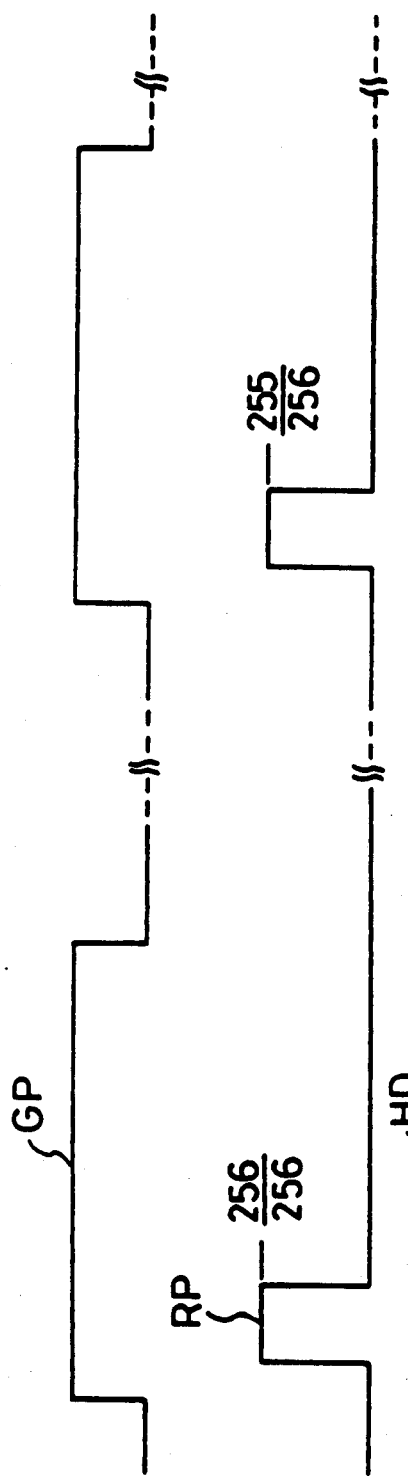
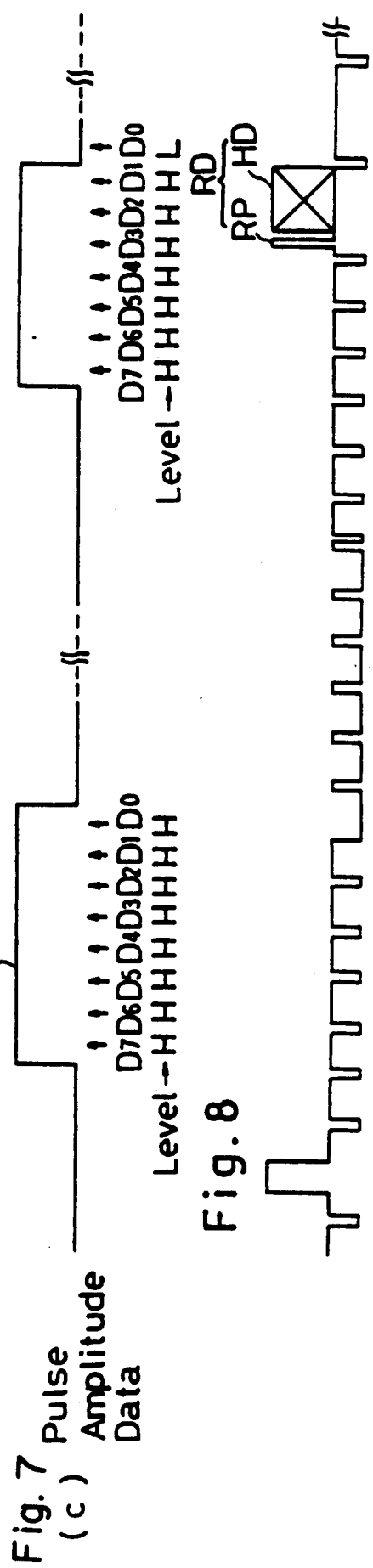
Fig. 7 (a) Gating Pulse
Fig. 7 (b) Ref. Pulse
Fig. 7 (c) Pulse Amplitude Data
Fig. 8

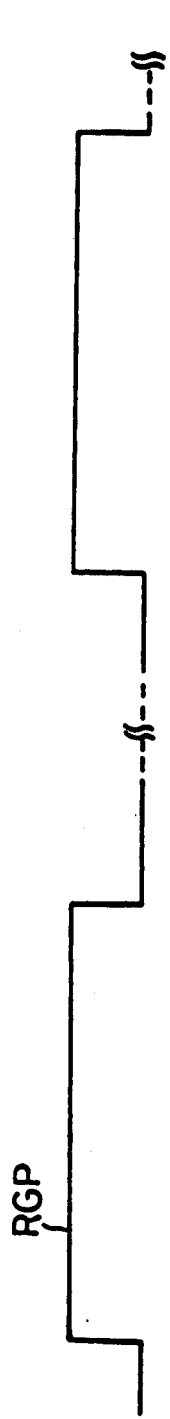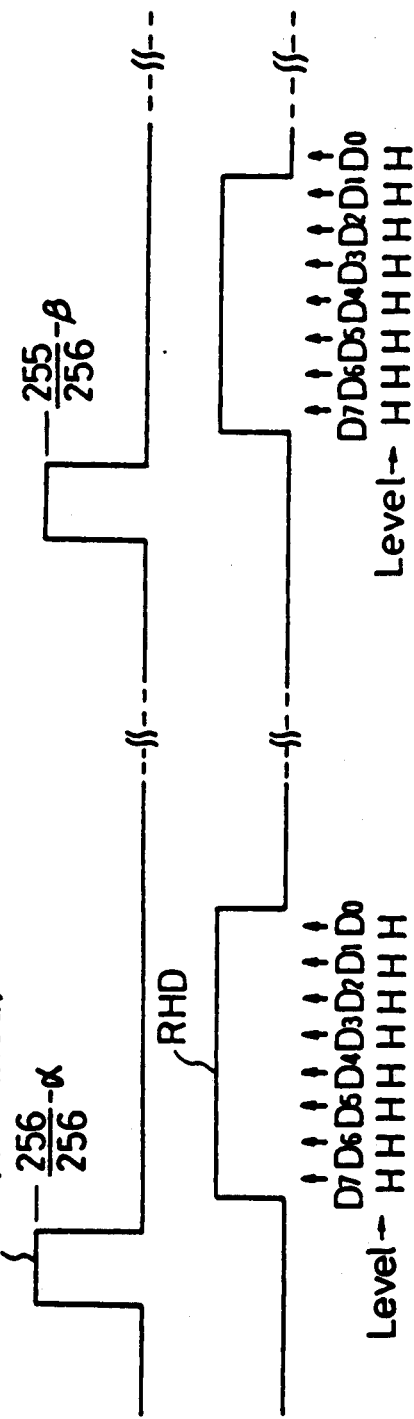

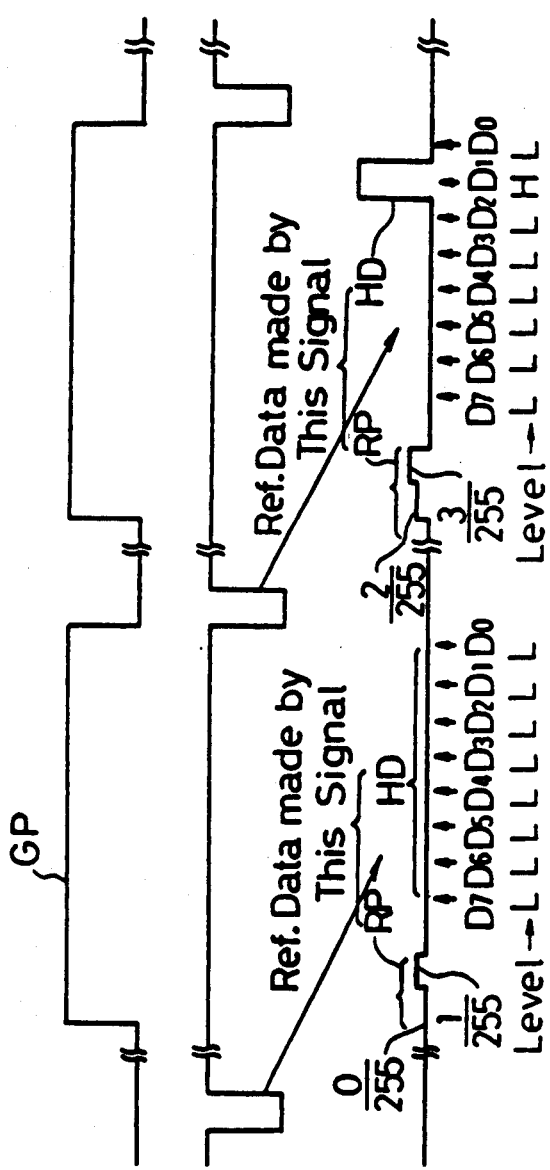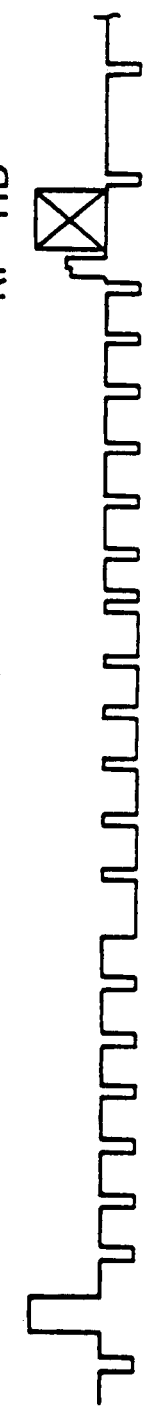
Fig.13(a) Gating Pulse
Fig.13(b) Ref.Data Synthesis Start Signal
Fig.13(c) Ref. Data
Fig.14

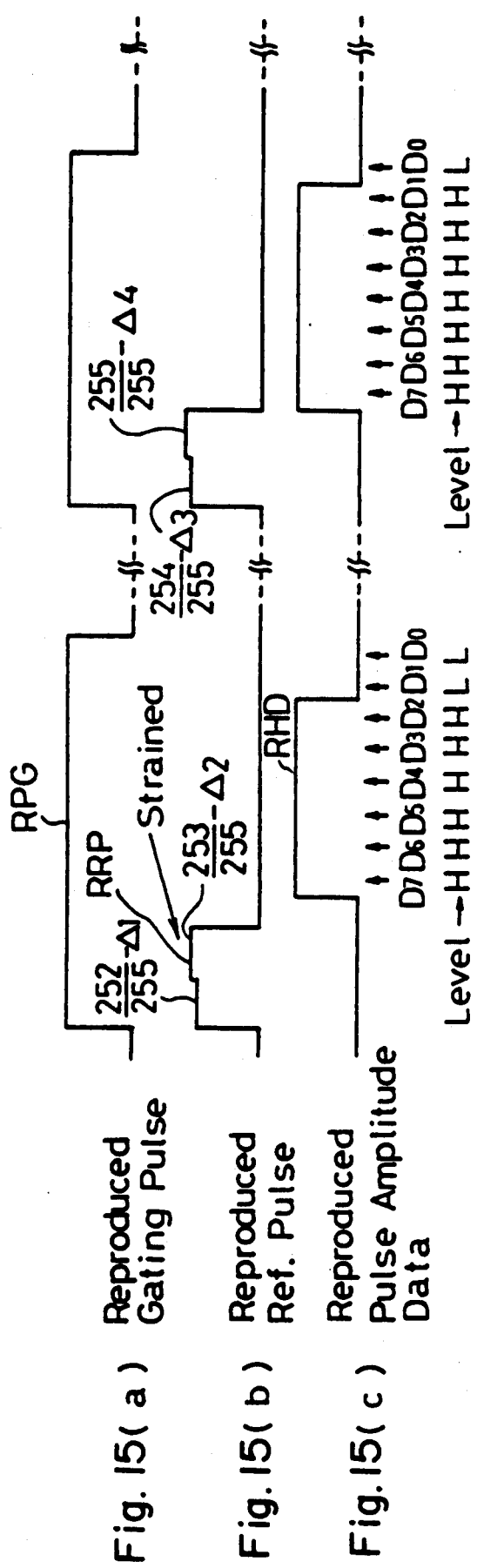

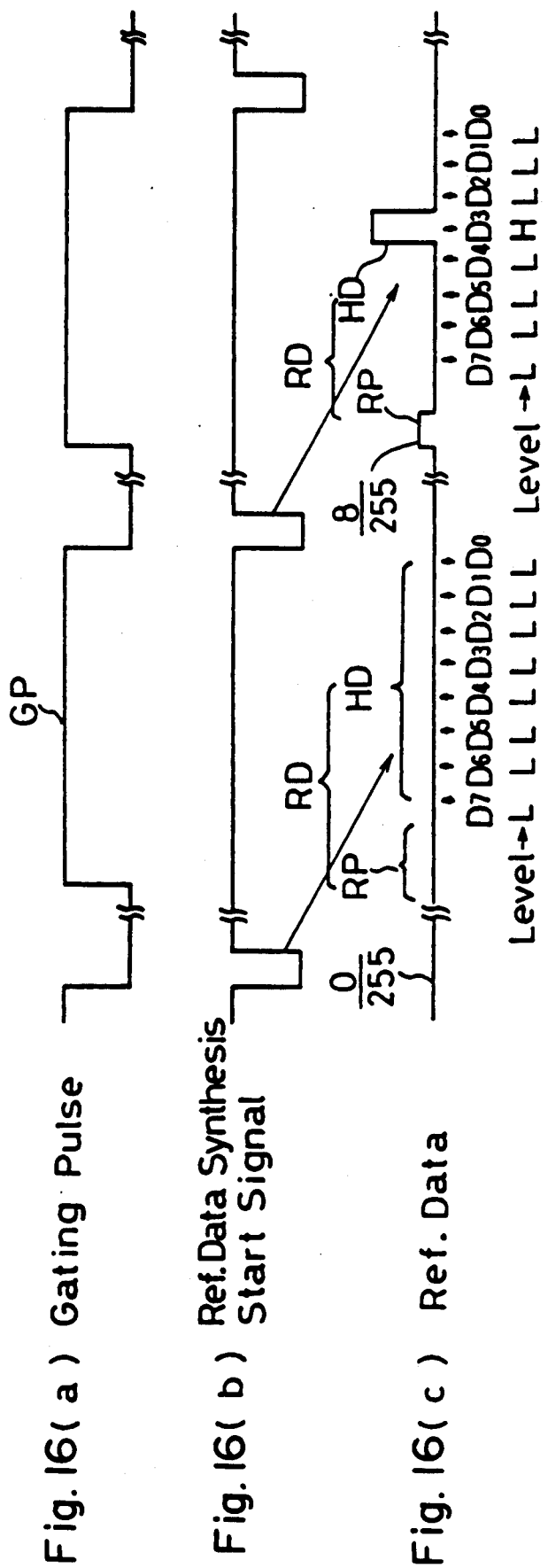

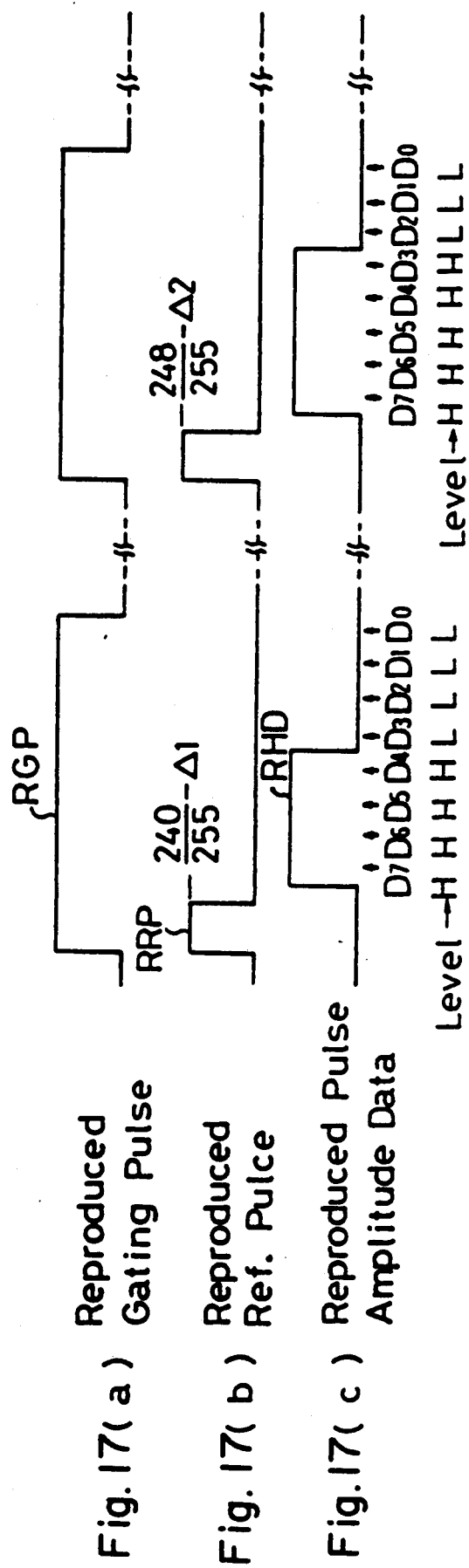

CHARACTERISTICS CORRECTOR

BACKGROUND OF THE INVENTION

1. Field of the Invention

The present invention generally relates to a signal recording and/or reproducing apparatus and, more particularly, to a characteristics corrector in the signal recording and/or reproducing device for automatically correcting a distortion resulting from the non-linearity in a signal processing system during the recording or reproduction and for automatically correcting the level of a reproduced signal.

2. Description of the Prior Art

In a signal recording and/or reproducing apparatus such as, for example, a magnetic video tape recording and/or reproducing apparatus (hereinafter referred to as a video tape player), one of the methods of recording a wide band video signal which is well known includes a channel division recording system. According to the channel division recording system, a single signal is divided into a plurality of channels so that the band width required for each channel can be reduced prior to the actual recording of the signal.

In the channel division recording method, if the signal to be recorded is a television signal, the signal is divided into a plurality of channels one for each horizontal scanning period. Finally the time-axis of the signal of each channel is expanded.

The channel division recording method is illustrated in FIG. 1 of the accompanying drawings. In the illustrated example, the input video signal is shown as divided into two channels CH.A and CH.B. The waveform (a) shown in FIG. 1 is the one of an input signal wherein characters H1, H2, H3, H4, . . . represent successive horizontal scanning periods, respectively. The input signal is divided into the channels CH.A and CH.B alternately for each horizontal scanning period with the time-axis thereof expanded to represent such waveforms as shown by (b) in FIG. 1.

When, by this division, the time-axis of the signal is expanded, the band width of each channel is reduced. However, since the signal can be recorded or reproduced in two systems, deterioration of picture qualities such as the appearance of scanning lines tends to occur when there is a difference in characteristics between these channels. In view of this, a device for automatically compensating for the difference in characteristics between the channels is necessitated.

One example of the characteristics corrector hitherto used in the video tape player, wherein the recording or reproduction is carried out by the division of the video signal into a plurality of channels as hereinabove described, is disclosed by Seishi Sasaki et al. in their papers "WIDE BAND VIDEO SIGNAL RECORDER HAVING LEVEL AND LINEARITY CORRECTOR" (IEEE Transactions on Consumer Electronics, vol. CE-32, No. 3, Aug. 1986) and "VTR for Bandwidth-compressed Hi-vision" (National Technical Report Vol. 32, No. 4, Aug. 1986). The characteristics corrector disclosed in the previously mentioned paper is reproduced in FIG. 2 of the accompanying drawings in schematic block circuit representation. Referring to FIG. 2, reference numeral 13 represents a memory for the storage of a reproduced ramp signal; reference numeral 14 represents an adding, averaging and checking circuit operable to perform an adding, averaging and checking of the reproduced ramp signal; reference numeral 15 represents a level correction table memory for the storage of a level correction table; reference numeral 16 represents a data memory for the storage of data of a reference ramp signal data; reference numeral 17 represents a data processing circuit; reference numeral 18 represents a switch for switching over addresses of the level correction table memory 15; reference numeral 19 represents an input terminal to which the reproduced signal is applied; reference numeral 20 represents an input terminal to which the reproduced ramp signal is applied; reference numeral 21 represents a time-axis data terminal; and reference numeral 22 represents a corrected output terminal.

While the prior art characteristics corrector is so constructed as hereinabove described, the ramp signal varying from a black level to a white level is recorded during a vertical blanking period of the video signal. Further, by reproducing such ramp a signal, the reproduced level can be coordinated with the recorded level. Assuming that the ramp signal, which had represented such a waveform as shown by (a) in FIG. 3 when recorded, represents such a distorted waveform as shown by (b) in FIG. 3 when reproduced, the reproduced ramp signal is supplied to a time base corrector (TBC) to adjust the time-axis thereof. This is so that the ramp signal during the recording can be matched in timing with that during the reproduction. This thereby renders the reproduced output level so as to match with the level of the input signal.

To describe the operation in detail, in FIG. 2 the reproduced ramp signal is first inputted to the adding, averaging and checking circuit 14 at which point a plurality of ramp signals are added together. This is to improve the signal-to-noise ratio. They are then checked as to the waveform of the reproduced ramp signal which has been averaged. This thereby eliminates any effect such as a dropout. The reproduced ramp signal which has been added, averaged and checked is subsequently stored in the reproduced ramp data memory 13 with the time-axis data used as an address. Then, the data stored in the reproduced ramp data memory 13 and the address are reversed and stored in the level correction table memory 15. The reference ramp signal data memory 16 stores therein the waveform of the ramp signal therein, which had been exhibited at the time of recording. Therefore, when a reproduced video signal data is applied through the switch 18 as an address of the level correction table memory 15, the address of the reference ramp signal data memory 16 is determined. Thus, the video signal data wherein the level correction is affected to an output of the reference ramp signal data memory 16, can be obtained.

The prior art characteristics corrector of the above described construction has the following problems. Since the timing of the ramp signal during the recording and that during the reproduction are required to be completely matched with each other, a highly precise time base corrector is necessitated. However, in the event of the occurrence of variation of the time-axis during one horizontal scanning period which is generally referred to as a velocity error, the timing of the ramp signal during the recording and that during the reproduction cannot be completely matched with each other during the latter half of the horizontal scanning period. Therefore, the recording level and the reproducing level cannot be coordinated with each other.

Also, with the signal such as the ramp signal used in the prior art device, wherein the period during which the level of the video signal represented by the ramp signal is of the same level and is short, displacement of the sampling position results in the receipt of an erroneous reproduced ramp data. Therefore, an accurate level correcting operation cannot be accomplished.

SUMMARY OF THE INVENTION

In view of the foregoing, the present invention has been devised with a view to substantially eliminating the above discussed problems. It is intended to provide an improved characteristics corrector which, even in the signal recording and/or reproducing apparatus which has no time base corrector, the level correcting operation can be properly performed.

According to one aspect of the present invention, there is provided a characteristics corrector which includes a reference pulse generating device for generating a plurality of reference pulses of varying amplitudes corresponding to different gradations from a black level to a white level of a video signal. Further included is a pulse amplitude data generating device for generating data necessitated to discriminate the amplitudes of the reference pulses, and a reference data inserting device for line-sequentially interleaving a reference data, comprised of a combination of one of the reference pulses of different amplitudes and a data representative of the amplitude of such reference pulse, during a vertical blanking period of a video signal to be recorded. Finally a level correcting device is included for synthesizing a level correction table with the use of a plurality of combinations of the reference pulses and the data representative of the respective amplitudes of the reference pulses obtained from a reproduced video signal and for correcting the level of the reproduced video signal.

According to the present invention, since the reference pulses have their own time width and, therefore, even though the time-axis of the reproduced video signal varies, the pulse amplitude during the reproduction can be determined if the neighborhood of the reference pulse is sampled and held. Also, since the data of the pulse amplitude is a quantified data, the value thereof will not vary even when distorted. Therefore, the reference pulses of varying amplitude corresponding to the gradations from the black level to the white level inserted in the video signal during the recording and the reproduction, respectively, can be accurately coordinated with each other. Accordingly, the level of the reproduced video signal can be accurately corrected.

According to another aspect of the present invention, the reference data is comprised of the plurality of reference pulses of varying amplitude and a pulse amplitude data used to discriminate the amplitude of at least one of the reference pulses. Because of this, the level correction table can be quickly formulated in the reproduction system.

According to a further aspect of the present invention, the reference pulses forming the reference data have a predetermined amplitude difference, and in the reproduction system, the level correction table can be formulated by completing the boundary between the reference pulses. Therefore, in the reproduction system, the level correction table can be quickly formulated without adversely affecting the accuracy of correction.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined solely by the appended claims. In the drawings, like reference numerals denote like parts in the several views, and:

FIG. 1 is a diagram used to explain the channel division recording system in the signal recording and/or reproducing apparatus;

FIG. 3 is a schematic block circuit diagram showing the prior art characteristics corrector;

FIG. 5 is a schematic block circuit diagram showing a reproduction system of the characteristics corrector shown in FIG. 4;

FIG. 6 to FIG. 9 are diagrams used to explain the operation of the characteristics corrector shown in FIG. 4;

FIG. 13 to FIG. 15 are diagrams used to explain the operation of the characteristics corrector shown in FIG. 12; and FIGS. 16 and 17 are diagrams used to explain the operation of the characteristics corrector according to a thrid preferred embodiment of the present invention.

DETAILED DESCRIPTION OF THE EMBODIMENTS

It is to be noted that, in the description of the preferred embodiment of the present invention, reference is made to the interleaving of each of the reference data RD during the vertical blanking period which are composed of reference pulses RP of 256 varying amplitudes, corresponding to the number of quantified levels of a 8-bit reproducing analog-to-digital converter, and serial pulse amplitude data HD.

Figure 2:
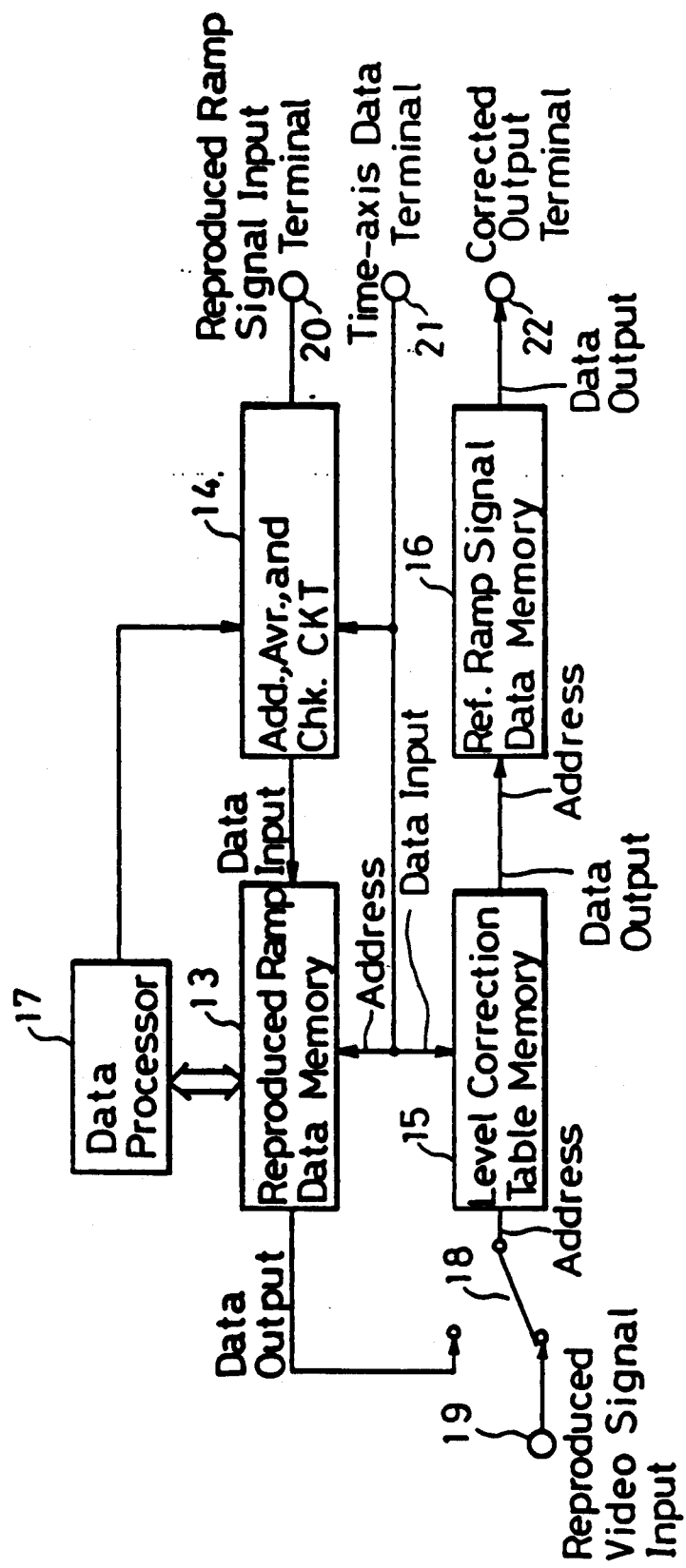
FIG. 2 is a diagram used to explain the operation of the prior art characteristics corrector.
Figure 4:
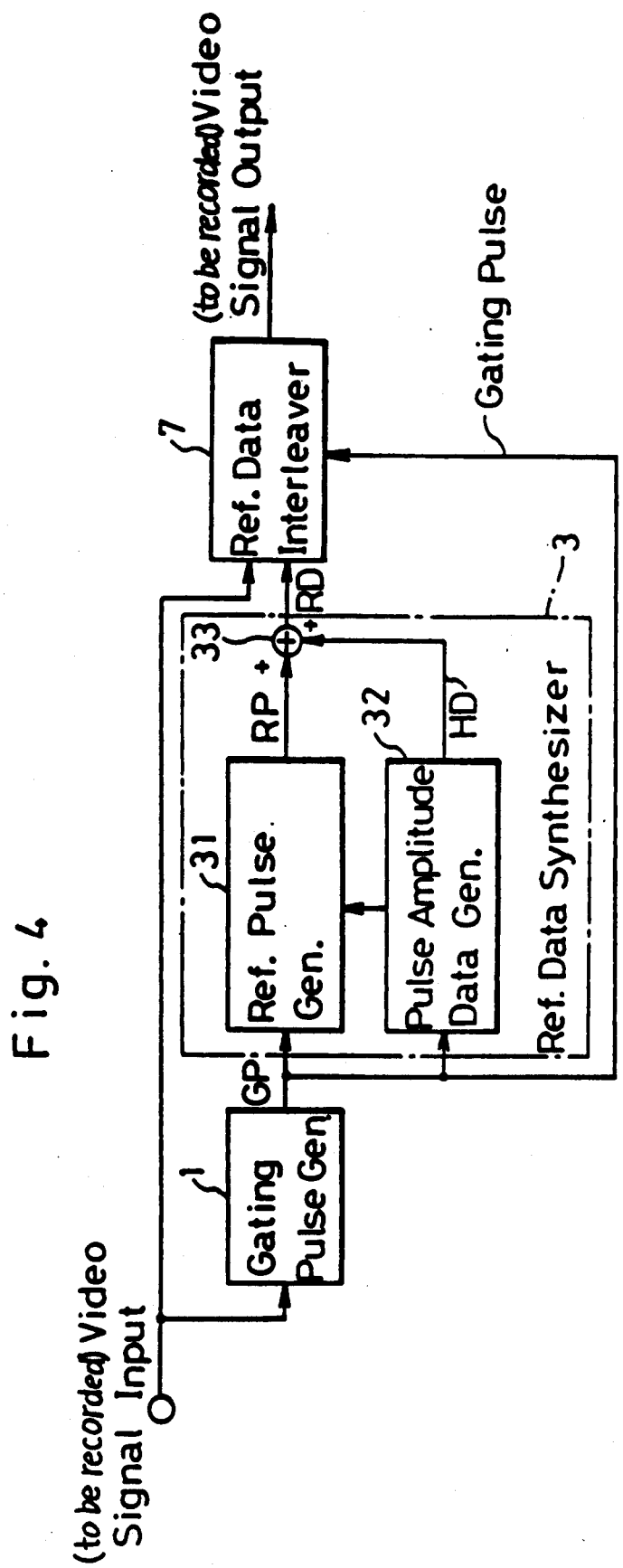
FIG. 4 is a schematic block circuit diagram showing a characteristics corrector according to a preferred embodiment of the present invention.

Referring first to FIG. 4 showing a block circuit of a recording system according to a first preferred embodiment of the present invention, reference numeral 1 represents a gating pulse generating device operable to separate vertical and horizontal synchronizing signals from a video signal to be recorded and generate a gating pulse GP; reference numeral 31 represents a reference pulse generating device operable in response to the gating pulse GP from the gating pulse generating device 1 to generate a reference pulse RP of 258 varying amplitudes from a black level to a white level; reference numeral 32 represents a pulse amplitude data generating device for generating a pulse amplitude data HD indicative of the amplitude of the reference pulse RP generated from the reference pulse generating device 31; reference numeral 33 represents an adder operable to sum the reference pulse RP and the pulse amplitude data HD on a time-sharing basis to provide a reference data RD. It is to be noted that the circuit elements 31, 32 and 33 described above altogether constitute a reference data synthesizing device 3.

Reference numeral 7 represents a reference data interleaving device for interleaving the reference data RD during the vertical blanking period of the recorded video signal.

FIG. 5 illustrates a block circuit of a reproducing system according to the first preferred embodiment of the present invention. In FIG. 5, reference numeral 8 represents a reproduced analog-to-digital converter for converting a reproduced video signal into a digital video signal; reference numeral 9 represents a reference pulse selecting device for selecting, from the digital video signal outputted from the analog-to-digital converter 8, a reproduced data RRP of the reference pulse interleaved during the recording; reference numeral 10 represents a pulse amplitude data selecting device for selecting a reproduced pulse amplitude data RHD from the reproduced video signal; reference numeral 11 represents a level correcting device for correcting the level of the reproduced video signal by the utilization of the output data RRP from the reference pulse selecting device 9 and the output data RHD from the pulse amplitude data selecting device 10; and reference numeral 12 represents a digital-to-analog converter for converting the level-corrected video signal into an analog video signal.

It is to be noted that, although the gate pulse generating device 1 used in the recording system may be concurrently used in the reproducing system, separate circuits capable of functioning in the same manner may be employed in the recording and reproducing systems, respectively.

The operation of the recording system shown in FIG. 4 will now be described with particular reference to FIGS. 6 to 8. In the recording system shown in FIG. 4, during the recording, the gate pulse generating device 1 operates to separate the vertical and horizontal synchronizing signals from the video signal to be recorded of the waveform shown by (a) in FIG. 6 and to generate the gate pulse GP of the waveform shown by (c) in FIG. 6 which is in a high level state during one horizontal scanning period three horizontal scanning periods subsequent to the vertical synchronizing signal. The waveform of the vertical synchronizing signal is shown by (b) in FIG. 6.

The reference pulse generating device 31 generates, during a first half of the gating pulse GP of the waveform shown by (a) in FIG. 7, the data RP of the reference pulses of an amplitude equal to the 256/256 quantified level of the waveform shown by (b) in FIG. 7 by, for example, reading the data from a read-only memory. Subsequently, the pulse amplitude data generating device 32 generates the pulse amplitude data HD of serial type indicative of the amplitude of the reference pulse during the latter half of the gating pulse GP. The waveform of the pulse amplitude data HD is shown by (c) in FIG. 7. Thereafter, each time the gating pulse GP is inputted, the data RP (255/256), (254/256), ..., (2/256) and (1/256) of the reference pulses of respective levels progressively decreasing by the decrement of (1/255) and the pulse amplitude data HD are generated. The respective waveforms of which data RP and HD are shown by (b) and (c) in FIG. 7. When reference data RD, comprised of one reference pulse RP and the associated pulse amplitude data HD paired with such one reference pulse RP, is interleaved by the reference data interleaving device 7 into the video signal to be recorded, an output signal of a waveform shown in FIG. 8 can be obtained. The output signal is subsequently recorded on a recording medium (not shown) through a recording circuit (also not shown).

Hereinafter, the operation of the reproducing system shown in FIG. 5 will be described with particular reference to FIG. 9.

During the reproduction, the reproduced video signal, the vicinity of a white level of which has been contracted under the influence of strains, is inputted. This video signal is subsequently converted into the digital video signal by the analog-to-digital converter 8. At the same time, the reproduced video signal inputted is supplied to the gating pulse generating device 1 which subsequently generates the reproduced gating pulse RGP having a varying time-axis and synchronized with the reproduced video signal. The waveform of the gating pulse RGP is shown by (a) in FIG. 9. In response to this reproduced gating pulse RGP, the reference pulse selecting device 9 generates, from the output data of the reproduced analog-to-digital converter 8, the reproduced reference pulse RRP (the waveform of which is shown by (b) in FIG. 9) of an amplitude varying (contracted by $\alpha, \beta$ ...) under the influence of the strains. Further on the other hand, the pulse amplitude data selecting device 10 gives the pulse amplitude data RHD (the waveform of which is shown by (c) in FIG. 9) capable of discriminating the pulse amplitude exhibited during the recording.

The reproduced pulse amplitude data RHD has its value which does not vary even when the reproduced video signal is affected by the strains. Accordingly, the pulse amplitude data corresponding to the pulse amplitude, obtained during the recording, of the reproduced reference pulse RRP can be easily obtained from the reproduced pulse amplitude data RHD recorded during the same vertical blanking period.

The level correcting device 11 makes use of all of the data of the reproduced reference pulse RRP as respective write-in addresses and formulates a level correction table by writing in the memory the reproduced pulse amplitude data HD (RHD) corresponding to the respective reproduced reference pulses RRP. This level correcting device 11 performs a level correcting operation in which, during a normal video period, the level correcting device 11 reads out a corrected value from the level correction table with the output data from the reproduced analog-to-digital converter 8 used as a read-out address. Also a removal of both of the pulse amplitude data HD and the reference pulses RP interleaved in the video signal during the recording takes place. Subsequently, and after the digital-to-analog conversion performed by the digital-to-analog converter 12, the reproduced video signal, whose level has been corrected, can be obtained.

In the embodiment described above, since no ramp signal is used and the reference pulse RP having a time width is utilized, the pulse amplitude during the reproduction can be accurately detected if the vicinity of the reference pulse is sampled and held, even though the reproduced video signal has a varying time-axis. Also, since the pulse amplitude data HD is a quantified data, the value thereof does not vary even if the reproduced video signal is strained. Accordingly, the pulse amplitudes of each of the reference pulses RP of varying amplitudes corresponding to gradations from the black level to the white level which have been interleaved during the recording can be accurately discriminated with those during the recording coordinated with those during the reproduction. Therefore, the accurate and correct level correction can be accomplished even though no time base correcting device is employed.

It is to be noted that, in the foregoing description of the first preferred embodiment of the present invention, each of the reference data RD comprised of pairs of the reference pulses RP and the pulse amplitude data 4D has been described as successively interleaved during one horizontal period falling within the vertical blanking period in the order from the pulse of highest amplitude down to the pulse of lowest amplitude. However, the sequence of interleaving may be such that each of the reference data RD can be interleaved in the order from the pulse of lowest amplitude down to the pulse of highest amplitude, or at random.

Figure 10:
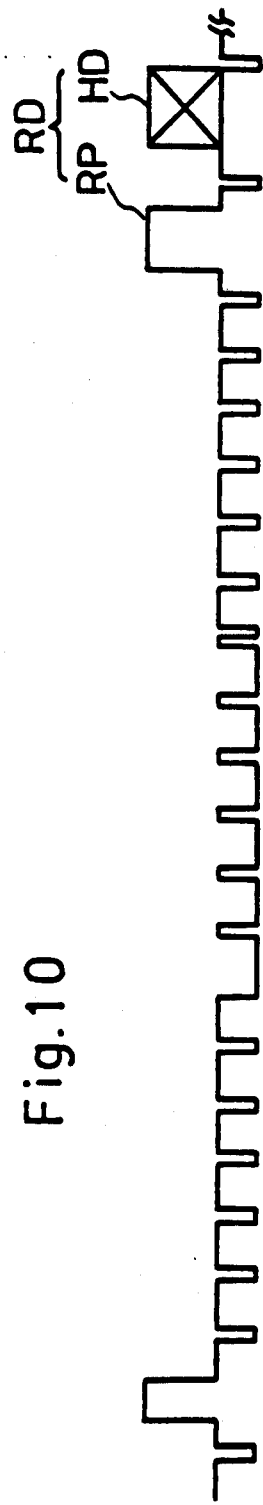
FIGS. 10 and 11 are diagrams used to explain the operation of the characteristics corrector according to respective modifications of the first preferred embodiment of the present invention.
Figure 11:
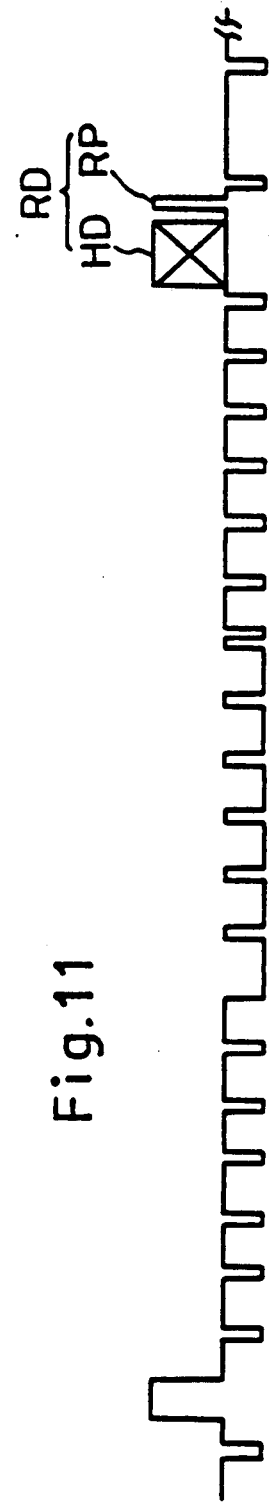

Also, the position at which the reference data RD is interleaved in the recorded video signal may be such as shown in FIG. 10 wherein only the reference pulse is interleaved during one horizontal period followed by the interleaving of the pulse amplitude data during the next succeeding horizontal period. Alternatively, as shown in FIG. 11, the pulse amplitude data may be interleaved in the recorded video signal during one horizontal period, followed by the interleaving of the reference pulse during the same horizontal period, or the interleaving of the reference pulse during one horizontal period may be followed by the interleaving of the pulse amplitude data during the same horizontal scanning period. Thus, the reference data interleaved during the vertical blanking period may be of any suitable pattern. Thus, even in this case, effects similar to those described hereinbefore can be obtained.

Also, in the foregoing description made in connection with the first preferred embodiment of the present invention, reference has been made to the level correcting system in which the reproduced pulse amplitude data RHD corresponding to the data of the reproduced reference pulse RRP taken as the addresses are written in the memory. Thus, during the normal video period, the corrected values are read out with the output data from the reproduced analog-to-digital converter 8 used as the address. However, a system wherein the difference between, for example, the data of the reproduced reference pulses RRP and the reproduced pulse amplitude data RHD are written in the memory as correction data and, during the normal video period, the corrected data can be read out with the output data from the reproduced analog-to-digital converter 8 used as the addresses so that the corrected data can be summed together with the output data from the analog-to-digital converter 8 for the correction of the level can be employed. Alternatively, a system can also be employed wherein a microcomputer is utilized to formulate the level correction data according to a predetermined programmed software so that the data can be interpolated in the event of occurrence of a discontinuity in the level correction data.

Yet, in the foregoing description, the pulse amplitude data have been shown as having one of two values, i.e., a high level value and a low level value. However, a quantified data such as, for example, three values, may be employed.

In addition, in the foregoing description, although reference has been made to the use of the data RRP of the reproduced reference pulses which can be obtained during the reproduction, means by which a plurality of data of the reproduced reference pulses are added together and averaged. This is because, in the event of occurrence of a drop-out, the data of the reproduced reference pulses may not be utilized may be employed for the purpose of enhancing the effects obtained by the present invention.

Figure 12:
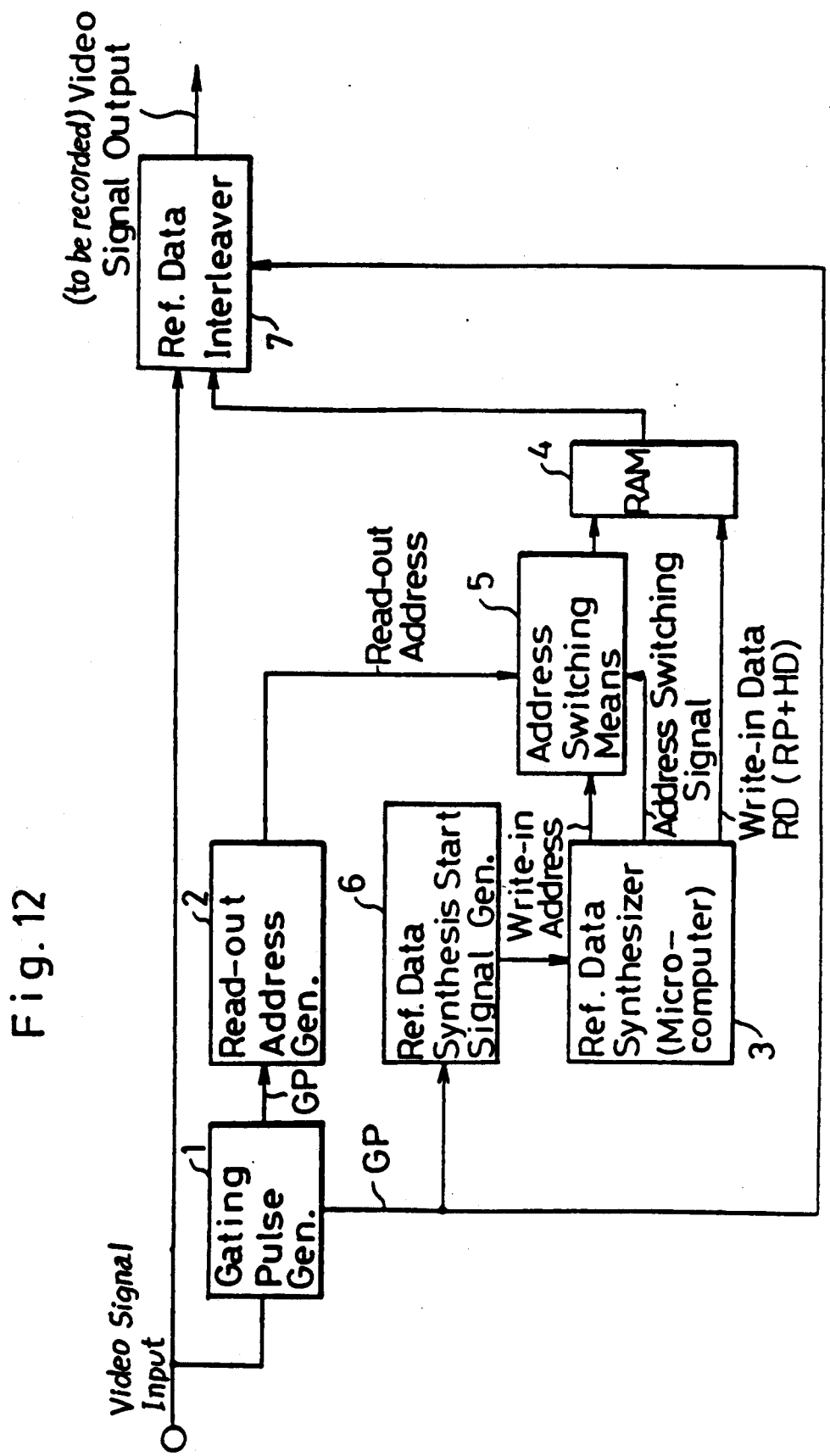
FIG. 12 is a schematic block circuit diagram showing a recording system in the characteristics corrector according to a second preferred embodiment of the present invention.

FIG. 12 illustrates a block circuit of the recording system according to a second preferred embodiment of the present invention. Referring now to FIG. 12, reference numeral 1 represents a gating pulse generating device operable to separate vertical and horizontal signals from a video signal to be recorded and generate a gating pulse GP; reference numeral 2 represents a read-out address generating device for generating an address for the read-out of reference data according to an output from the gating pulse generating device 1; and reference numeral 3 represents a reference data synthesizing device for formulating a reference data RD comprised of two reference pulses RP and one pulse amplitude data HD. In this embodiment, the reference data synthesizing device 3 is employed in the form of a microcomputer. Reference numeral 4 represents a random access memory for the temporary storage of the reference data RD formulated by the microcomputer 3; reference numeral 5 represents an address switching device for switching an address of the random access memory 4 over between a read-out side and a write-in side according to an address switching signal supplied from the microcomputer 3; reference numeral 6 represents a reference data synthesis start signal generating device for generating a signal necessitated for the microcomputer 3 to initiate the synthesis or formulation of the reference data RD according to the output from the gating pulse generating device 1; and, reference numeral 7 represents a reference data interleaving device for interleaving the reference data RD during the vertical blanking period of the video signal to be recorded.

It is to be noted that the reproducing system utilizable in the practice of the second preferred embodiment of the present invention is identical in structure and function to that shown in and described with reference to FIG. 5 in connection with the first preferred embodiment of the present invention. Therefore, the details thereof are not reiterated for the sake of brevity.

The operation of the recording system shown in FIG. 12 will now be described with particular reference to FIGS. 6 and 11 to 15.

In the recording system shown in FIG. 12, during the recording, the gate pulse generating device 1 operates to separate the vertical and horizontal synchronizing signals from the video signal to be recorded of the waveform shown by (a) in FIG. 6 and to generate the gate pulse GP of the waveform shown by (c) in FIG. 6 which is in a high level state during one horizontal scanning period three horizontal scanning periods subsequent to the vertical synchronizing signal. The waveform of the vertical synchronizing signal is shown by (b) in FIG. 6. This is identical with that described in connection with the operation of the gate pulse generating device used in the first preferred embodiment.

The reference data synthesis start signal generating device 6 generates the reference data synthesis start signal of the waveform shown by (b) in FIG. 13 when the level of the gating pulse GP of the waveform shown by (a) in FIG. 13 changes from a high level state to a low level state. The microcomputer 3 when receiving the reference data synthesis start signal from the start signal generating device 6 starts the synthesis of the reference data RD. In other words, after the microcomputer 3 has caused the address switching device 5 to assume the write-in position, the microcomputer 3 formulates a pair of reference pulses RP having respective amplitudes corresponding to quantified levels of 0/255 and 1/255 and a serial pulse amplitude data HD indicative of an amplitude of a quantified level of 0/255 of one of the reference pulses RP which is lower in quantified level, and then stores the pair of the reference pulses RP and the pulse amplitude data HD in the random access memory 4 as a reference data RD. Finally, it causes the address switching device 5 to assume the read-out position. Thereafter, each time the reference data synthesis start signal is inputted, the microcomputer 3 repeats the above described operation in such a manner that the pair of the reference pulses RP (2/255), (3/255), ... , (254/255) and (255/255) having levels progressively increasing by the increment of (1/255) are formulated. Then the pulse amplitude data HD corresponding to one of the paired reference pulses RP, which is lower in quantified level, is added thereto to provide each reference data RD, followed by the storage, in the random access memory 4. The reading of the reference data RD from the random access memory 4 is carried out by causing the address generating device 2 to output a read-out address when the gating pulse GP changes from a low level state to a high level state and then by causing the reference data RD of the waveform shown by (c) in FIG. 13 which has been stored in the random access memory 4, to be readout. The reference data RD read out from the random access memory 4 is interleaved by the reference data interleaving device 7 thereby to give the output signal of the waveform shown in FIG. 14. This output signal is subsequently recorded on a recording medium through a recording circuit.

The operation of the reproducing system will now be described with reference to FIGS. 5 and 15.

During the reproduction, the reproduced video signal, the vicinity of a white level of which has been contracted under the influence of strains, is inputted. This video signal is subsequently converted into the digital video signal by the analog-to-digital converter 8. At the same time, the reproduced video signal inputted is supplied to the gating pulse generating device 1 which subsequently generates the reproduced gating pulse RGP having a varying time-axis and synchronized with the reproduced video. The waveform of the gating pulse RGP is shown by (a) in FIG. 15. In response to this reproduced gating pulse RGP, the reference pulse selecting device 9 generates, from the output data of the reproduced analog-to-digital converter 8, the reproduced reference pulse RRP (the waveform of which is shown by (b) in FIG. 15) of an amplitude varying (contracted by Δ1, Δ2, Δ3, Δ4 ... ) under the influence of the strains. Also, on the other hand, the pulse amplitude data selecting device 10 gives the pulse amplitude data RHD (the waveform of which is shown by (c) in FIG. 15) capable of discriminating the pulse amplitude exhibited during the recording.

The level correcting device 11 makes use of one of the paired reproduced reference pulses RRP, which is lower in level, as an address for writing the reproduced pulse amplitude data RHD in the memory. It also makes use of the other of the reproduced reference pulses RRP as an address for writing the reproduced pulse amplitude data which is added with 1/255. In this way, by the utilization of the data of the reproduced reference pulses RRP from 0/255 down to 255/255 as respective write-in addresses, the level correction table in which the associated pulse amplitude data HD are stored is formulated. Then, the level correcting device 11 performs a level correcting operation in which, during a normal video period, the level correcting device 11 reads out a corrected value from the level correction table with the output data from the reproduced analog-to-digital converter 8 used as a read-out address, followed by a removal of both of the pulse amplitude data HD and the reference pulses RP interleaved in the video signal during the recording. Subsequently, and after the digital-to-analog conversion performed by the digital-to-analog converter 12, the reproduced video signal whose level has been corrected can be obtained.

According to the second preferred embodiment described above, the formulation of the level correction table during the reproduction can be accomplished relatively quickly. Specifically, it can be accomplished in a time about one half the time required in the practice of the first preferred embodiment described hereinbefore.

It is to be noted that, in describing the second preferred embodiment of the present invention, each reproduced reference data has been described as being comprised of the pair of the reference pulses. Further the pulse amplitude data has been described as corresponding to one of the paired reference finally they have been described as interleaved in the order from the lowest value down to the highest value during the vertical blanking period. However, the interleaving may be accomplished in the order from the pulse amplitude data of highest level to the pulse amplitude data of lowest level. Also, the number of the reference pulses in each reproduced reference pulse data may not be always limited to two such as described above, but may be three or more. Also, in such case, each reference pulse data may comprise three or more reference pulses with the pulse amplitude data corresponding to one of the three reference pulses. Moreover, each reference pulse data may comprise reference pulses, which vary according to a certain rule, in combination of the pulse amplitude data corresponding to any one of those reference pulses.

A third preferred embodiment of the present invention will now be described.

The recording system used in the practice of the third preferred embodiment of the present invention is generally identical with that shown in and described with reference to FIG. 12 except that the manner in which the reference data RD is formed in the reference data synthesizing means or microcomputer 3 used in the recording system according to the third preferred embodiment differs from that in the second preferred embodiment shown in and described with reference to FIG. 12. Similarly, the reproducing used in the practice of the third preferred embodiment of the present invention is generally identical with that shown in and described with reference to FIG. 5 except that the manner in which the level correction table is formed in the level correcting means 11 used in the reproducing system according to the third preferred embodiment differs from that in the second preferred embodiment.

FIG. 16 illustrates the reference data RD formed in the recording system according to the third preferred embodiment of the present invention.

The operation according to the third embodiment will now be described.

When the reference data synthesis start signal of the waveform shown by (b) in FIG. 16 is inputted, the microcomputer 3 starts the synthesis of the reference data RD. After the microcomputer 3 has caused the address switching device 5 to assume the write-in position, the microcomputer 3 formulates a reference pulse RP having an amplitude corresponding to a quantified level of 0/255 and a serial pulse amplitude data HD indicative of an amplitude of a quantified level of 0/255. It then stores a combination of the reference pulse RP and the pulse amplitude data HD in the random access memory 4 as a reference data RD and finally causes the address switching device 5 to assume the read-out position. The microcomputer 3 repeats the above described operation in such a manner that the reference pulses RP (8/255), (16/255), ..., and (248/255) having levels progressively increasing by the increment of eight quantified levels are formulated and the pulse amplitude data HD corresponding to the respective reference pulses RP which are then added together to provide associated reference data RD, followed by the storage in the random access memory 4.

The next succeeding reference pulse represents 248+8=256 which exceeds the maximum value (255/255) of the 8-bit quantified level. Therefore, the reference pulses corresponding to all of the quantified levels are formulated in such a manner that, in order to minimize a bias relative to the reference pulses already formulated, the succeeding reference pulses are sequentially rendered to be (4/255), (12/255), ..., and (252/255); then, (2/255), (10/255), ..., and (255/255); (10/255), ..., and (250/255); (6/255), ..., and (254/255); and (1/255), ..., and (249/255), thereby to fill up a gap between the formulated reference pulses. Thereafter, the pulse amplitude data are added respectively to these reference pulses thereby to form the associated reference data which are subsequently stored in the random access memory 4. When reading the reference data from the random access memory 4, the read-out address is generated to read the reference data, the waveform of which is shown by (c) in FIG. 16, from the random access memory 4 and is subsequently supplied to the reference data interleaving device 7.

Hereinafter, the operation of the level correcting device for the formulation of the level correcting table will be described with reference to FIG. 17.

The reproduced reference pulse, of the waveform shown by (b) in FIG. 17 and having an amplitude varying under the influence of strains, is inputted from the reference pulse selecting device 9 to the level correcting device 11. Further, at the same time, the pulse amplitude data of the waveform shown by (c) in FIG. 17, capable of discriminating the pulse amplitude exhibited during the recording, is also inputted from the pulse amplitude data selecting device 10 to the level correcting device 11. The level correcting device 11 makes use of the reproduced reference pulses RRP, whose amplitudes of initially inputted quantified level are (0/255), (8/255), ..., and (248/255), as respective addresses for writing the reproduced pulse amplitude data RHD in the memory, and formulates a level correction table by interpolating between the addresses. During the normal video period following the vertical blanking period, the level correction table is used for the level correction of the reproduced video signal.

Then, during the vertical blanking period, the reproduced reference pulses RRP of (4/255), (12/255), ..., and (252/255) are used as respective addresses necessary for the corresponding pulse amplitude data to be stored in the memory, followed by the formulation of the level correction table by interpolating from the associated pulse amplitude data HD.

In this way, a new level correction table is formulated by the interpolation each time the reproduced reference data is obtained. After the quantified levels of the video signals to be recorded corresponding to the quantified levels of all of the reproduced video signals have been obtained, no interpolation is carried out each time the data is obtained. However, both of the reproduced reference pulse by which the level correction table is obtained and only portion corresponding to the pulse amplitude data are updated.

According to the third preferred embodiment of the present invention, since the number of the reference pulses and the number of the pulse amplitude data formed during one vertical blanking period are reduced, the formulation of the level correcting tables can be facilitated.

It is to be noted that, in describing the foregoing embodiment of the present invention, interpolation has been described as carried out to both of the reference pulses and the corresponding pulse amplitude data to determine the quantified level of the video signal to be recorded corresponding to each quantified level of the reproduced video signal. The quantified level is subsequently stored in the memory for the formation of the level correction table. However, the level correction table may be formed, for example, in which the difference between each quantified level of the reproduced video signal and the corresponding quantified level of the video signal to be recorded obtained by the interpolation is stored in the memory. In this case, during the normal video period, the correction data is read out from the memory with the output data of the reproduced analog-to-digital converter 8 used as the address, followed by the addition with the output data of the reproduced analog-to-digital converter 8.

As hereinbefore fully described, according to the first preferred embodiment of the present invention, the characteristics corrector is so constructed that the reproduced reference pulse having a pulse width (time width) and the pulse amplitude data which is the quantified data can be interleaved as the reference data during the vertical blanking period of the video signal to be recorded. Thus, the reproducing system can make use of this reproduced reference data to formulate the level correction data and the level of the reproduced video can be subsequently corrected. Therefore, even in the signal recording and/or reproducing apparatus having no time base correcting device employed, the level correction can be accurately carried out.

Also, according to the second preferred embodiment of the present invention, since a plurality of the reference pulses of varying pulse amplitudes are interleaved in each reference data, the level correction table can be quickly formulated.

Furthermore, according to the third preferred embodiment of the present invention, since the reference data having the reference pulses of predetermined pulse amplitude difference are interleaved in the video signal to be recorded so that, in the reproducing system, interpolation is carried out between these reproduced reference pulses to formulate the level correction table, the level correction table can be quickly formulated.

Although the present invention has fully been described in connection with the preferred embodiments thereof with reference to the accompanying drawings used only for the purpose of illustration, those skilled in the art will readily conceive numerous changes and modifications within the framework of obviousness upon the reading of the specification herein presented of the present invention. Accordingly, such changes and modifications are, unless they depart from the spirit and scope of the present invention as delivered from the claims annexed hereto, to be construed as included therein.

What is claimed is:

1. A characteristics corrector in a video signal processing system for correcting characteristics of the video signal processing system at the time of recording and/or reproducing a video signal, the corrector comprising:
   reference pulse generating means for generating reference pulses of varying amplitudes corresponding to plural gradations from a black level to a white level of a video signal to be recorded, the reference pulses, each being of a single non-varying amplitude and being recorded during a blanking period of the video signal;
   pulse amplitude data generating means for generating quantified data used for amplitude discrimination of the reference pulses;
   reference data interleaving means for interleaving, as reference data, the reference pulses and corresponding pulse amplitude data indicative of the amplitudes thereof during the blanking period; and
   level correcting means for correcting the level of a reproduced video signal by utilization of a plurality of reference pulses and corresponding pulse amplitude data obtained from the reproduced video signal.

2. The characteristics corrector as claimed in claim 1, wherein said level correcting means is operable to formulate a level correction table for level correction of the reproduced video signal with the use of the plurality of reference pulses and corresponding pulse amplitude data.

3. The characteristics corrector as claimed in claim 1, wherein said reference pulse generating means generates a plurality of reference pulses of varying amplitudes during each blanking period and wherein said pulse amplitude data for discriminating the pulse amplitude of at least one of the plural reference pulses so that the plurality of reference pulses in combination with the corresponding pulse amplitude data, can be interleaved as the reference data during the blanking period of the video signal to be recorded.

4. The characteristics corrector as claimed in claim 1, wherein said reference pulse generating means generates one or more reference pulses having, for each blanking period, two or more steps of quantified levels and is capable of recruiting the quantified levels while increasing or decreasing according to a predetermined rule and wherein said level correcting means is operable to formulate a level correction table by interpolating steps between the reference pulses having two or more steps obtained from the reproduced video signal and the corresponding pulse amplitude data.

5. The characteristics corrector as claimed in claim 4, wherein said level correcting means is operable to update data of portions obtained from the reproduced reference data each time the reference pulse data is given, after correction data, which satisfy the level correction data, without interpolating data have been obtained from the plurality of the reproduced reference data.

6. The characteristics corrector as claimed in claim 1, wherein said pulse amplitude data is serial data.

7. The characteristics corrector as claimed in claim 1, wherein said reference pulses are pulses of respective amplitudes corresponding to quantified levels of a reproduced analog-to-digital converter operable to convert the reproduced video signal into a digital reproduced video signal.

8. The characteristics corrector as claimed in claim 1, wherein said level correcting means is operable to formulate a level correction table with differences between data of reproduced reference pulses and data of reproduced pulse amplitudes being used as correction data, to read out the correction data with analog-to-digital conversion data of the reproduced video signal used as an address and to add the correction data, which have been read out, to the analog-to-digital conversion data of the reproduced video signal to thereby accomplish the level correction.

9. The characteristics corrector as claimed in claim 1, wherein said level correcting means is operable to formulate a level correction table by adding and averaging a plurality of data of reproduced reference pulses and without using data in the event of occurrence of a dropout.

10. The characteristics corrector as claimed in claim 1, wherein said pulse amplitude data is quantified data having three or more values.

* * * * *